United States Patent
Katsumata et al.

[11] Patent Number: 5,353,065
[45] Date of Patent: Oct. 4, 1994

[54] APPARATUS FOR RECEIVING WIDE/STANDARD PICTURE PLANE TELEVISION SIGNAL

[75] Inventors: Kenji Katsumata; Shigeru Hirahata; Masato Sugiyama; Isao Nakagawa, all of Yokohama, Japan

[73] Assignee: Hitachi, Ltd., Tokyo, Japan

[21] Appl. No.: 899,040

[22] Filed: Jun. 16, 1992

Related U.S. Application Data
[63] Continuation of Ser. No. 552,559, Jul. 16, 1990, abandoned.

[30] Foreign Application Priority Data
Jul. 17, 1989 [JP] Japan .................... 1-182668

[51] Int. Cl.⁵ ............... H04N 11/06; H04N 11/20
[52] U.S. Cl. .................... 348/556; 348/389
[58] Field of Search ............. 358/11, 12, 140; 348/554–558, 445–449; H04N 11/20, 11/22

[56] References Cited
U.S. PATENT DOCUMENTS

| | | | |
|---|---|---|---|
| 4,651,208 | 3/1987 | Rhodes et al. | 358/180 |
| 4,855,824 | 8/1989 | Fuhrer | 358/12 |
| 5,001,551 | 3/1991 | Otto | 358/12 |
| 5,003,389 | 3/1991 | Iooke et al. | 358/12 |
| 5,032,907 | 7/1991 | Isnardi | 358/12 |
| 5,083,196 | 1/1992 | Isnardi et al. | 358/12 |
| 5,121,208 | 6/1992 | Citta et al. | 358/11 |
| 5,132,793 | 7/1992 | Hirahata et al. | 358/12 |
| 5,134,479 | 7/1992 | Ohishi | 358/11 |
| 5,146,327 | 9/1992 | Sugimori et al. | 358/12 |

FOREIGN PATENT DOCUMENTS

| | | | |
|---|---|---|---|
| 61-214873 | 9/1986 | Japan | H04N 5/46 |
| 61-224786 | 10/1986 | Japan | H04N 5/46 |
| 63-146672 | 6/1988 | Japan | H04N 5/46 |
| 1-200788 | 8/1989 | Japan | H04N 5/46 |
| 1-221068 | 9/1989 | Japan | H04N 5/46 |

*Primary Examiner*—Stephen Brinich
*Attorney, Agent, or Firm*—Antonelli, Terry, Stout & Kraus

[57] ABSTRACT

Disclosed is a wide picture plane/standard picture plane television signal receiving apparatus which comprises: a first signal processing circuit for doubling the scanning speed of an input standard television signal; an aspect ratio conversion circuit for converting a display aspect ratio of the double scanning speed television signal from the first signal processing circuit into a wide aspect ratio; a second signal processing circuit for processing an input EDTV television signal into a double scanning speed television signal with a wide aspect ratio; a first signal selection circuit for selecting one of the respective output signals from the aspect ratio conversion circuit and the second signal processing circuit; a wide aspect display device for displaying the selected output signal from the first signal selection circuit; an EDTV signal detection circuit for detecting the processing effected on the EDTV signal in the second signal processing circuit to thereby switch the contact of the first signal selection circuit to its second signal processing circuit side from its first signal processing circuit side.

12 Claims, 12 Drawing Sheets

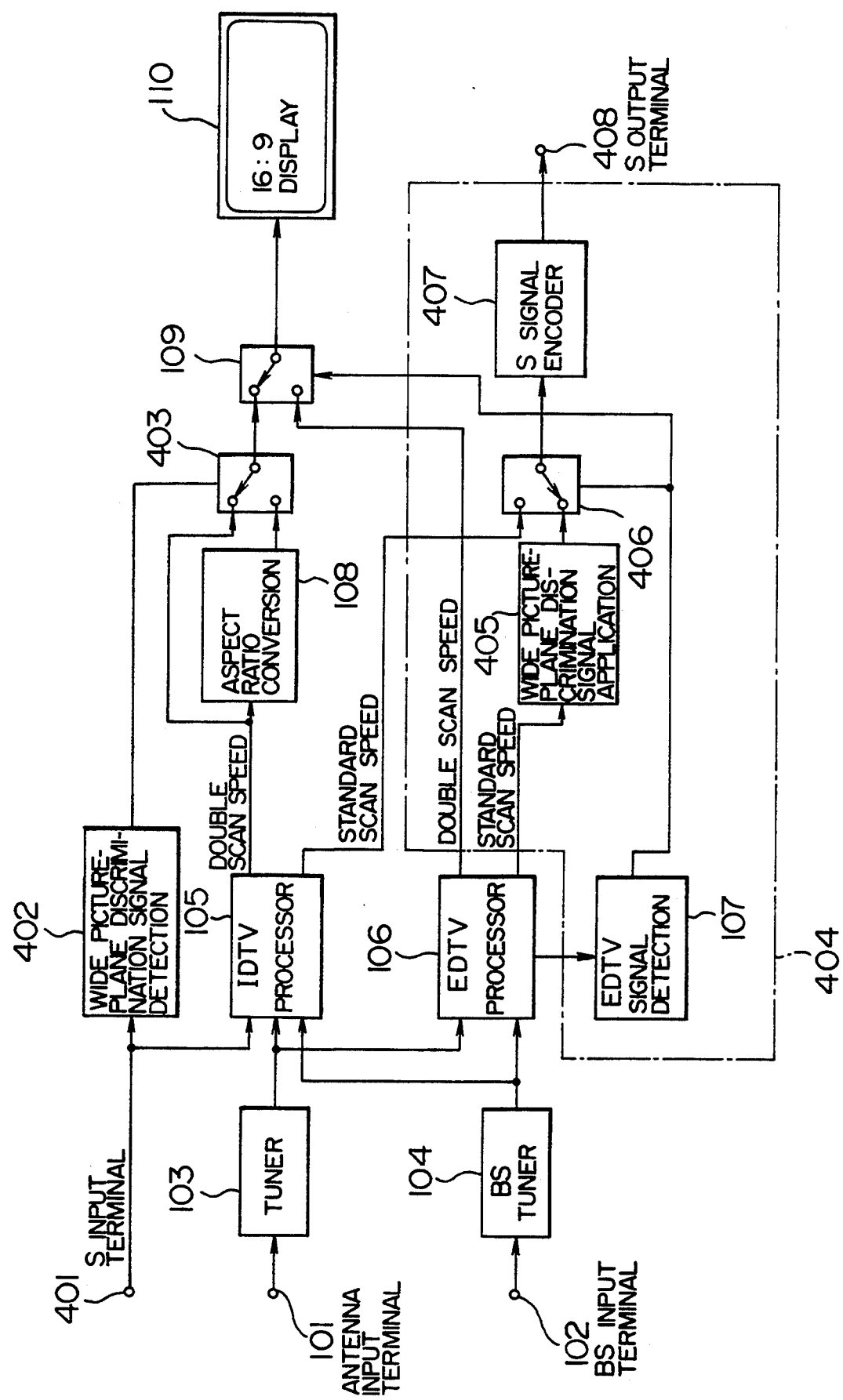

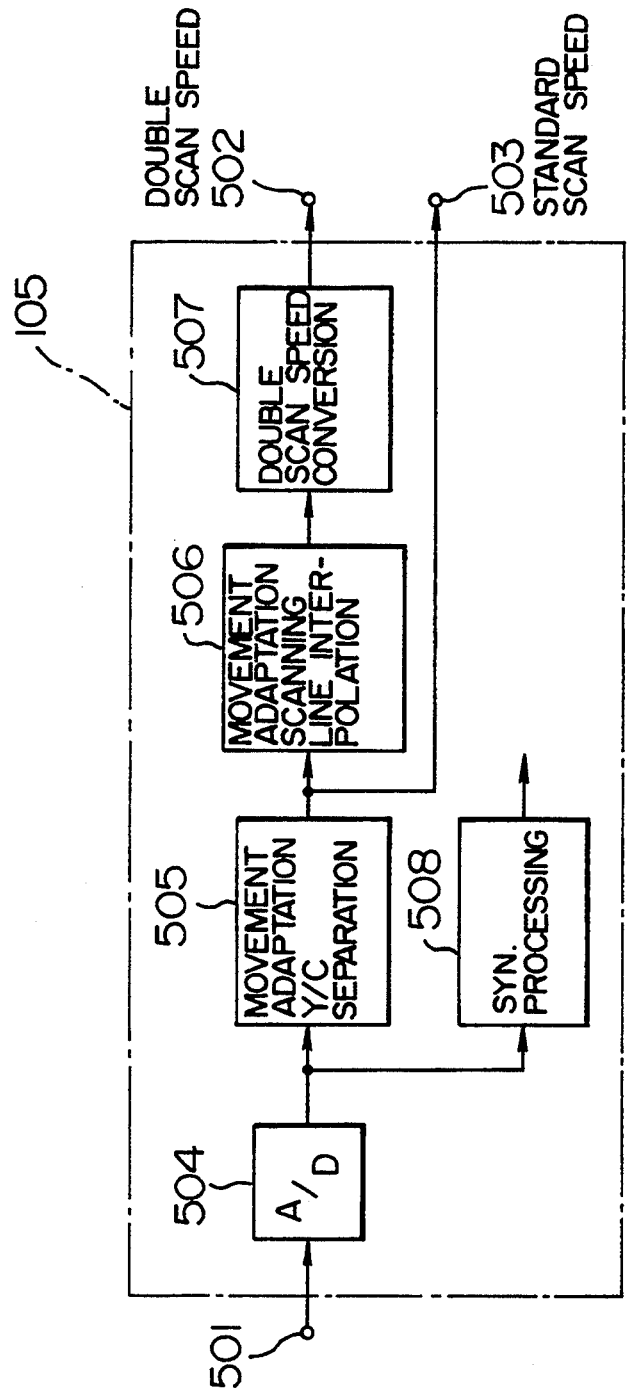
F I G. 5

F I G. 9
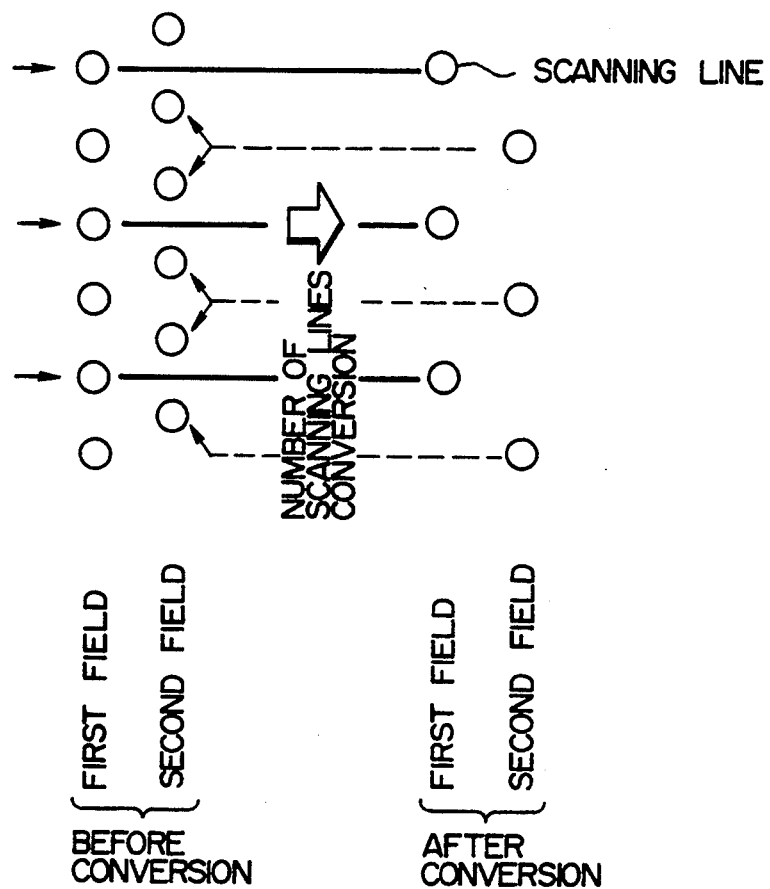

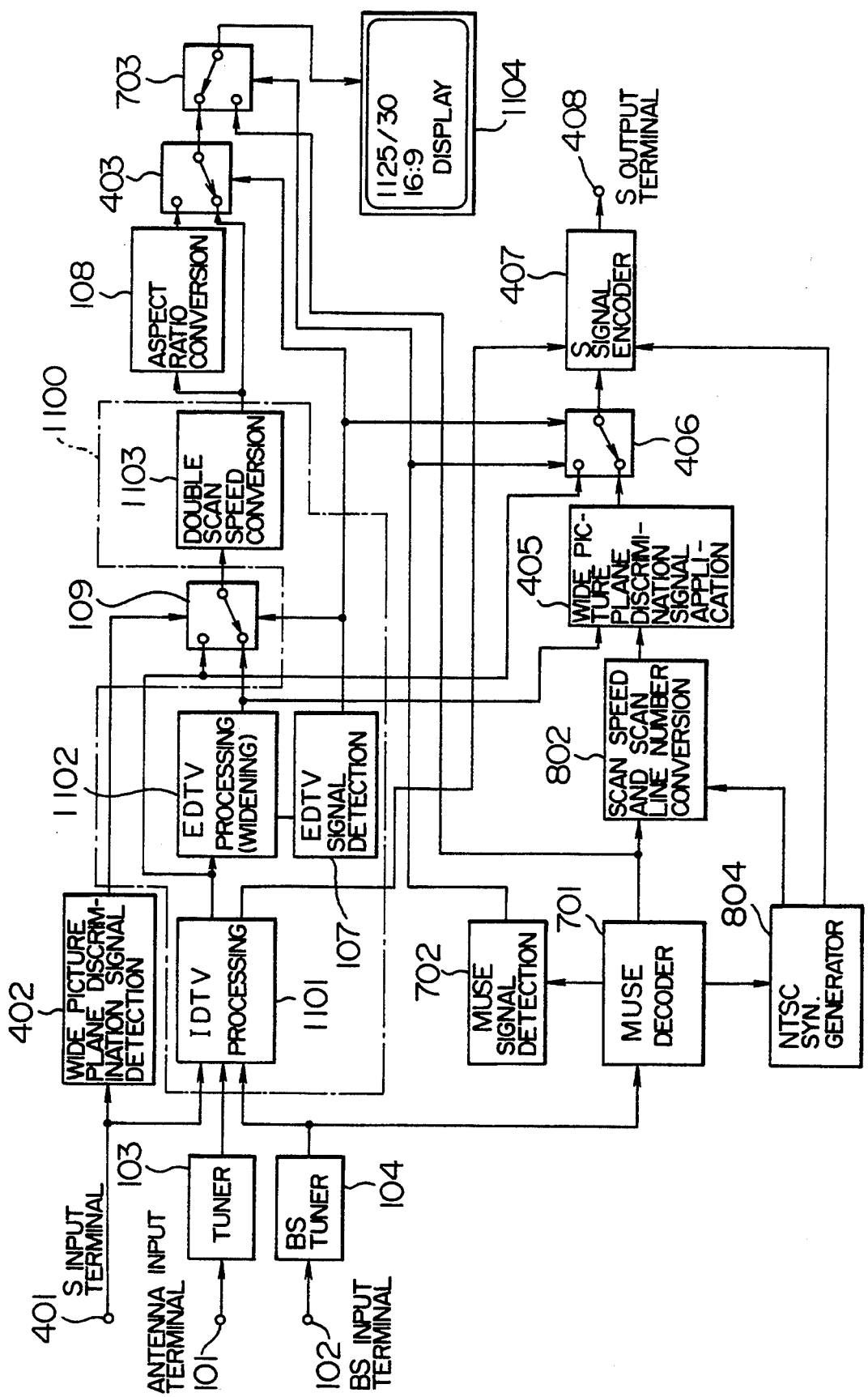

COMPARISION OF SPECIFICATION
BETWEEN NTSC AND MUSE

|  | NTSC | MUSE |
|---|---|---|
| NUMBER OF SCAN LINES | 525 | 1125 |
| HORIZONTAL SCAN FREQUENCY | 15.75 kHz | 33.75 kHz |
| VERTICAL SCAN FREQUENCY | 59.94 Hz | 60 Hz |
| ASPECT RATIO | 4:3 | 16:9 |
| SCAN METHOD | INTERLACING | INTERLACING |

FIG. 15

(EXAMPLES OF CLOCK FREQUENCY FOR NTSC REPRODUCTION)

| No. | NTSC STANDARD CLOCK FREQUENCY (MHz) | VARIOUS FACTORS OF FREQUENCY | | | | | CONDITIONS | | | | |
|---|---|---|---|---|---|---|---|---|---|---|---|
| | | RELATION WITH TRANS-MISSION CLOCK | HORIZONTAL SCAN FREQUENCY $f_H$ (KHz) | NUMBER OF HORIZONTAL PICTURE ELEMENTS | NUMBER OF HORIZONTAL SCAN LINES PER FIELD (60 Hz) | RATE OF VIDEO IN HORIZONTAL SCAN | (1) BAND | (2) $f_H \times N$ | (3) INTERLACING | (4) DISPLAY AREA | (5) INTEGER RATIO |
| 1 | 12.312 | 19/25 | 15.39 | 800 | 256.5 | 0.935 | ○ | ○ | ○ | × | ○ |
| 2 | 13.608 | 21/25 | 15.75 | 864 | 262.5 | 0.866 | ○ | ○ | ○ | ○ | ○ |
| 3 | 14.256 | 22/25 | 15.84 | 900 | 264 | 0.831 | ○ | ○ | × | ○ | ○ |
| 4 | 12.6 | 14/18 | 15.75 | 800 | 262.5 | 0.935 | ○ | ○ | ○ | × | ○ |
| 5 | 14.175 | 14/16 | 15.75 | 900 | 262.5 | 0.831 | ○ | ○ | ○ | ○ | ○ |
| 6 | 14.04 | 13/15 | 15.6 | 900 | 260 | 0.831 | ○ | ○ | × | ○ | ○ |
| 7 | 12.6 | 7/9 | 15.75 | 800 | 262.5 | 0.935 | ○ | ○ | ○ | × | ○ |
| 8 | 14.175 | 7/8 | 15.75 | 900 | 262.5 | 0.831 | ○ | ○ | ○ | ○ | ○ |

APPARATUS FOR RECEIVING WIDE/STANDARD PICTURE PLANE TELEVISION SIGNAL

This is a continuation of application Ser. No. 552,559, filed Jul. 16, 1990, now abandoned.

BACKGROUND OF THE INVENTION

The present invention relates to a wide picture plane/standard picture plane television signal receiving apparatus which can selectively receive a standard television signal having a standard picture plane in accordance with the NTSC system and a television signal, for example such as an EDTV (Enhanced Definition Television) signal, a MUSE (Multiple Sub-Nyquist Sampling Encoding) signal, or the like, originally having an aspect ratio of a wide picture plane, and which can perform picture display with a wide aspect ratio upon reception of either television signal.

Recent propagation of large-sized television receivers necessarily requires provision of a high precision picture. In such a movement, there has been proposed, as disclosed in Japanese Patent Unexamined Publication No. Sho-61-123295, an IDTV (Improved Definition Television) in which a frame memory is used to perform three-dimensional processing in a television signal receiving apparatus. In the IDTV, not only the vertical resolution is greatly improved when a still picture is sent in, but disturbance components peculiar to the standard television can be completely eliminated.

Further, researches on an EDTV (Enhanced Definition Television) in which high definition processing is performed at both the transmission and reception sides have been eagerly effected. Specific examples of such an EDTV can be seen, for example, in Japanese Patent Unexamined Publication Nos. Sho-63-78685 and Sho-63-36693.

In the EDTV, in addition to the attainment of high definition by the IDTV, it is intended to attain the improvement of horizontal resolution and the widening of the picture plane aspect ratio. The first generation EDTV system mainly includes techniques of insertion of a ghost elimination reference signal at the transmission side, performing three-dimensional signal processing by use of a frame memory at the reception side, and performing double speed scanning.

In the second generation EDTV, in addition to the above-mentioned techniques, it is expected that widening of a picture plane and insertion of high precision information become its main techniques. Although the method of the improvement of horizontal resolution and the widening of the picture plane aspect ratio is still in the stage of research, it is known that in an EDTV receiver, a non-interlacing picture having 575 scanning lines and a frame frequency of 60 Hz is displayed in a wide aspect display.

Moreover, the MUSE (Multiple Sub-Nyquist Sampling Encoding) system, which is a high definition television transmission system developed by Japan Broadcasting Corporation (hereinafter referred to as "NHK"), attracts public attention. The MUSE system is a so-called "Hi-Vision" system in which a high definition television video signal is transmitted in the condition of band compression. As for this transmission system, experimental broadcasting has been conducted, and periodic test broadcasting has been started since the spring of 1989 in Japan.

As described in the "NHK Technical Journal", Vol. 39, No. 2, Consecutive No. 172, 1987, pp. 1–53, the MUSE system is a system in which a luminance signal and a color difference signal are multiplexed on each other on a time base and picture elements are thinned so that the picture elements circulate by a pair of frames to thereby attain the band compression. In the MUSE system, it is defined that the signal is an interlacing signal having 1125 scanning lines and a frame frequency of 30 Hz and the aspect ratio of the picture plane is 16:9. Thus, the MUSE system is largely different in standard from the NTSC system which is the current broadcasting system.

In order to receive the signal in the foregoing system, it is necessary to use a receiver having a large-scaled circuit using a frame memory. Currently, the development of individual receivers separately for the EDTV system and the Hi-Vision system has been authorized. It is however supposed that a receiver capable of selectively receiving a plurality of broadcasting signals of those different systems by one and the same receiver will be required in the future.

At the present, however, there is no receiver in which existence of such a plurality of broadcasting systems different from each other is taken into consideration. It is the present situation that only a signal conversion device has been developed for enabling a current receiver to receive the Hi-Vision broadcasting. The signal conversion device is a so-called down converter which has been developed by NHK.

In the NTSC system which is the current broadcasting system, the signal is an interlacing signal having 525 scanning lines and a frame frequency of 30 Hz and the aspect ratio of the picture plane is 4:3. That is, a down converter is required to convert the number of scanning lines from 1125 to 525 and the aspect ratio of the picture plane from 16:9 to 4:3. In the down converters, there are two display modes which are shown in FIGS. 2A and 2B.

FIGS. 2A and 2B show the display areas of the down converters in each of which the thick-line frame shows a display of an aspect ratio of 4:3. In a first system, the aspect ratio is converted from 16:9 to 4:3 by cutting off the opposite right and left ends of a wide picture plane as shown in FIG. 2A. In a second system, the opposite upper and lower ends of a picture plane of the current display system are cut off so that a picture of 16:9 can be displayed on the display of 4:3. These two systems are effective means for displaying a picture of a wide aspect ratio in the current display of 4:3.

The down converters of those two display modes have the following problems. That is, the down converter of the first mode in which the opposite right and left ends of the picture plane of the Hi-Vision signal are cut off has a problem (1) that the information is omitted at the right and left sides of the picture plane and another problem (2) that the vertical resolution is lowered. On the other hand, the down converter of the second mode in which the opposite upper and lower ends of the current picture plane are cut off has a problem (3) that the vertical resolution is further lowered, and another problem (4) that the blanking period appears in the picture plane of the display.

The above problem (1) is caused by making the aspect ratio of the MUSE signal coincident with the aspect ratio of the NTSC signal, so that the opposite right and left side portions which are visible in the Hi-Vision system becomes invisible in the case of using the down converter. In the case of a video signal of, for example, characters or the like, it becomes impossible to read the characters or the like, and therefore this problem will be a serious one.

The above problem (2) is caused by reducing the scanning lines from 1125 to 525, the above problem (3) is caused by reducing the scanning lines from 1125 to about 390, and the above problem (4) is caused by inserting periods having no picture in the upper and lower ends of the current display so as to display the whole of a picture of an aspect ratio of 16:9.

Although use of a down converter enables the current receiver to see a picture of the Hi-Vision system, the technique is not always sufficient.

As described above, when television receivers of the EDTV system and of the Hi-Vision system are adopted in the future, there is a possibility that there exist television picture display units of various modes and various kinds, in which, for example, the aspect ratio is a wide one of 16:9 and a current standard one of 4:3, the number of scanning lines is 1125 and 525, the scanning speed is a standard one and a double one, and so on.

Accordingly, it will become necessary to perform signal processing in accordance with the mode of the display picture plane of an individual one of such various kinds of television receivers. Further, the same applies to a television signal recording/reproducing apparatus, such as a VTR (Video Tape Recorder) and so on.

SUMMARY OF THE INVENTION

A first object of the present invention is to provide a wide picture plane/standard picture plane television which can selectively receive a standard television signal of a standard picture plane according to the NTSC system and a television signal, such as an EDTV signal, a MUSE signal, or the like, originally having an aspect ratio of a wide picture plane, which can perform picture display with a wide aspect ratio upon reception of either television signal.

A second object of the present invention is to provide a wide picture plane/standard picture plane which can selectively receive a standard television signal of a standard picture plane according to the NTSC system and a television signal, such as an EDTV signal, a MUSE signal, or the like, originally having an aspect ratio of a wide picture plane, which can perform picture display with a wide aspect ratio upon reception of either television signal, and which is provided with means for enabling an ordinary VTR according to the current standard system to record/reproduce such various television signals.

According to the present invention, the above first object can be attained by the wide picture plane/standard picture plane television signal receiving apparatus which comprises an IDTV processor, an aspect ratio conversion means for converting an aspect ratio of the output signal of the IDTV processor into a wide aspect ratio, an EDTV processor provided with an EDTV signal detection means, a signal selection means for switching the respective output signals from the aspect ratio conversion means and the EDTV processor, and a double scanning speed display means with a wide aspect ratio.

The above first object can be attained also by the wide picture plane/standard picture plane television signal receiving apparatus which comprises a television signal scanning speed doubling means, a high definition television signal receiving means provided with means for detecting a high definition television signal, and a signal selection means for switching the respective output signals of the high definition television signal receiving means and the television signal scanning speed doubling means.

According to the present invention, the above second object can be attained by the wide picture plane/standard picture plane television signal receiving apparatus which comprises an IDTV processor, an aspect ratio conversion means for converting an aspect ratio of the output signal of the IDTV processor into a wide aspect ratio, an EDTV processor provided with an EDTV signal detection means, a first signal selection means for switching the respective output signals from the aspect ratio conversion means and the EDTV processor, a wide picture plane discrimination signal detection means for detecting whether a wide picture plane discrimination signal is multiplexed on an input signal or not, an aspect ratio conversion operation inhibit means for inhibiting the aspect ratio conversion operation of the aspect ratio conversion means in response to the output signal of the wide picture plane discrimination signal detection means, a wide picture plane discrimination signal application means for adding a wide picture plane discrimination signal onto the output signal of the EDTV processor, a second signal selection means for switching the respective output signals of the aspect ratio conversion means and the wide picture plane discrimination signal application means, and an S signal encoder for converting the output signal of the second signal selection means into a signal capable being recorded and reproduced in an ordinary VTR of the standard system.

The above second object can be attained also by the wide picture plane/standard picture plane television signal receiving apparatus which comprises a television signal scanning speed doubling means, a high definition television signal receiving means, a scanning speed and scanning line number conversion means for converting a high definition television signal into an NTSC signal, a wide picture plane discrimination signal application means for adding a wide picture plane discrimination signal onto the output signal of the scanning speed and scanning line number conversion means, a signal selection means for switching the respective output signals of the television signal scanning speed doubling means and the wide picture plane discrimination signal application means, and an S signal encoder for converting the output signal of the signal selection means into a signal capable being recorded and reproduced in an ordinary VTR of the standard system.

BRIEF DESCRIPTION OF THE DRAWINGS

Other features and advantages of the present invention will be apparent from the following description taken in connection with the accompanying drawings, wherein:

FIG. 4 is a block diagram illustrating another embodiment of the present invention;

FIG. 5 is a block diagram illustrating an example of the configuration of the IDTV processor in FIG. 4;

FIG. 9 is an explanatory view showing an example of operation of conversion of the number of scanning lines;

FIGS. 11 through 13 are block diagrams illustrating still further embodiments of the present invention;

FIG. 14 shows comparison of specification between the NTSC system and the MUSE system; and FIG. 15 shows numerical relationship for enabling synchronizing signals of the NTSC system to be produced from synchronizing signals of the MUSE system.

DESCRIPTION OF THE PREFERRED EMBODIMENTS

Figure 1:
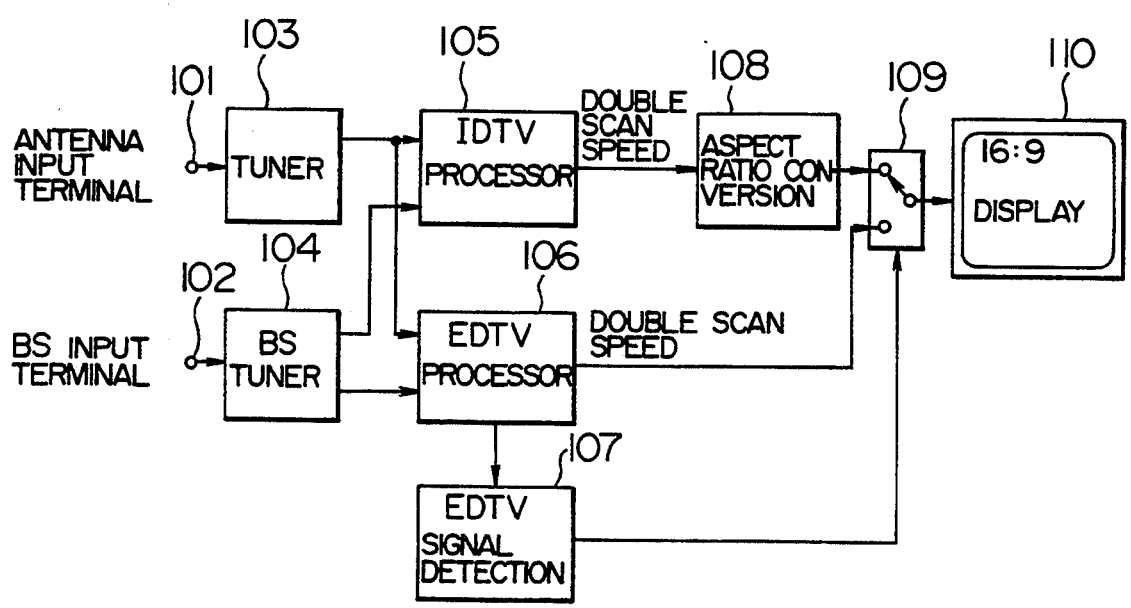
FIG. 1 is a block diagram illustrating an embodiment of the present invention.
Figure 2A:
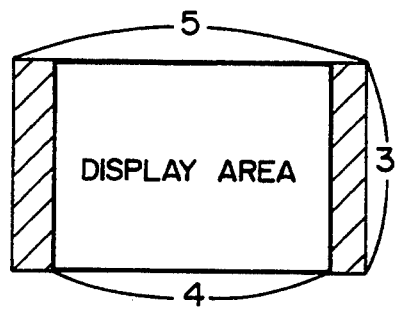
FIGS. 2A and 2B are explanatory views each showing the display area on the display in the case of using the down converter.
Figure 2B:
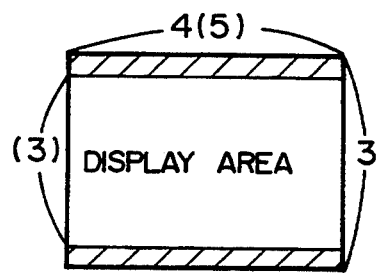

The television signal in accordance with the NTSC system is a signal for performing interlacing display with 525 scanning lines and 60 Hz field frequency. In the second-generation EDTV system which is expected to be a wide picture plane television system, the display is non-interlacing display with 525 scanning lines and 60 Hz field frequency.

Further, in the MUSE system which is another wide picture plane television system, as described above, the television signal is an interlacing signal with 1125 scanning lines and 60 Hz field frequency, and the aspect ratio of the picture plane is a wide aspect ratio of 16:9.

Even in the case where the NTSC system, the EDTV system, and the MUSE system coexist as television signal sources, the display unit performs display in a wide picture plane. For the NTSC signal, aspect ratio conversion is performed by using an aspect ratio conversion means so that the video signal is compressed on the time base and another signal of blanking or the like is disposed in the vacant period. As a result, even if an NTSC signal having a standard aspect ratio of 4:3 is supplied to the display having such a wide aspect ratio of 16:9, the signal can be normally displayed without being distorted in its display contents.

When a wide aspect ratio signal, such as a television signal of the EDTV system or the MUSE system is supplied, the signal is subject to signal processing by an EDTV processor or an MUSE decoder and then displayed as it is in the wide aspect ratio picture plane of the display unit. At this time, the signal to be displayed is switched by using means for judging whether the signal is of the NTSC system or the MUSE system.

Since it is made possible to display not only a television signal having a wide aspect ratio but an ordinary television signal having a standard aspect ratio in a display of a wide aspect ratio, signals of three different television systems can be selectively received by a single receiver without causing any problem.

Next, the method of recording/reproducing a wide picture plane television signal in a VTR employing the current standard system will be described hereunder.

First, the case where recording/reproducing is made in a current domestic-use VTR will be described. In the case of use of a current domestic-use VTR, for example of the S-VHS type, it is possible to record signals of about 5 MHz in the frequency band of a luminance signal. This corresponds to horizontal resolution of about 400 lines. The band of an NTSC signal is, on the other hand, about 4 MHz which corresponds to a horizontal resolution of about 320 lines.

In the case of recording an NTSC signal, accordingly, there is a little room in the band in the VTR so that it is possible to record a television signal of a wide picture plane as it is. At this time, the resolution of a television signal of a wide picture plane is about 300 lines because the television signal has a band of 5 MHz. That is, it is possible to reproduce a signal having horizontal resolution substantially equal to that of an NTSC signal. On the basis of such a consideration, it is possible to record/reproduce a signal of a wide picture plane in a dometic-use VTR.

If a signal recorded in the above-mentioned method is processed as it is as an ordinary NTSC signal and reproduced in an ordinary display having an aspect ratio of 4:3, the displayed picture becomes vertically distorted. If the signal is reproduced as it is in a display having a wide aspect ratio of 16:9, a natural picture can be obtained. Thus, in reproducing, if the signal is displayed as it is in a wide display, it is possible to obtain a picture which is not cut off and in which deterioration in vertical resolution is minimized by using the processing by means of an EDTV processor.

Next, the case where a signal band of a high definition television system is recorded/reproduced in an ordinary standard system VTR will be described. In this case, the band for recording and reproducing is so sufficient as to cause no problem. Accordingly, a signal having a scanning speed doubled by the television signal scanning speed doubling means and a high definition television signal are switched by means of a switching circuit so that one of those signals is selected and outputted as a double scanning speed television signal through an encoder to thereby make it possible to output only in the form of a double scanning speed television signal. Further, in inputting, the double scanning speed television signal is supplied to a double scanning speed display through a double scanning speed input terminal and a switching circuit so that the signal is reproduced as it is in the recorded state. Accordingly, for various input sources, it becomes possible to record and reproduce the contents of broadcasting of those sources.

Referring to the drawings, the present invention will be described in detail with respect to the preferred embodiments thereof.

FIG. 1 shows an embodiment of the present invention. In FIG. 1, the system has an input terminal 101 for receiving a ground broadcasting signal transmitted from an antenna or the like, another input terminal 102 for receiving a satellite broadcasting signal (BS), a tuner 103, a BS tuner 104, an IDTV processor 105 for processing a standard signal of the NTSC system so as to produce a high definition signal, an EDTV processor 106, an EDTV signal detection circuit 107, an aspect ratio conversion circuit 108, a switching circuit 109 for switching a standard signal and an EDTV signal to a path selected for one of those signals as an output signal, and a display 110 having a wide aspect ratio of 16:9.

In FIG. 1, the respective ground broadcasting and satellite broadcasting signals are tuned by the tuners 103 and 104 and then supplied to and processed by the IDTV processor 105 and EDTV processor 106 so as to be outputted as signals of double speed scanning, respectively.

The signal processed by and outputted from the IDTV processor 105 has a standard aspect ratio of 4:3 and is a double scanning speed signal in which the number of scanning lines is doubled. Since the signal has a standard aspect ratio of 4:3, if the signal is displayed as it is in the display 110 having a wide aspect ratio of 16:9, the displayed picture is distorted in such a manner that, for example, a circle becomes a horizontally elongated oval. Accordingly, in the case where such a signal is displayed in a display having a wide aspect ratio of 16:9, the aspect ratio of the signal is converted in the aspect ratio conversion circuit 108 so that the signal is time-compressed in the horizontal direction and the opposite sides are covered with blanking to thereby obtain a picture having an aspect ratio of 4:3 in the center of the picture plane. An example of a simple configuration of the aspect ratio conversion circuit 108 is shown in FIGS. 3A, 3B and 3C.

Figure 3A:
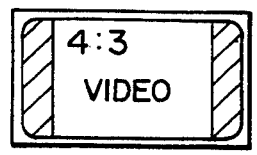
FIG. 3A is a view showing the aspect ratio conversion.

FIG. 3A shows the state where a signal having an aspect ratio of 4:3 is actually displayed in a display having a wide aspect ratio of 16:9.

Figure 3B:
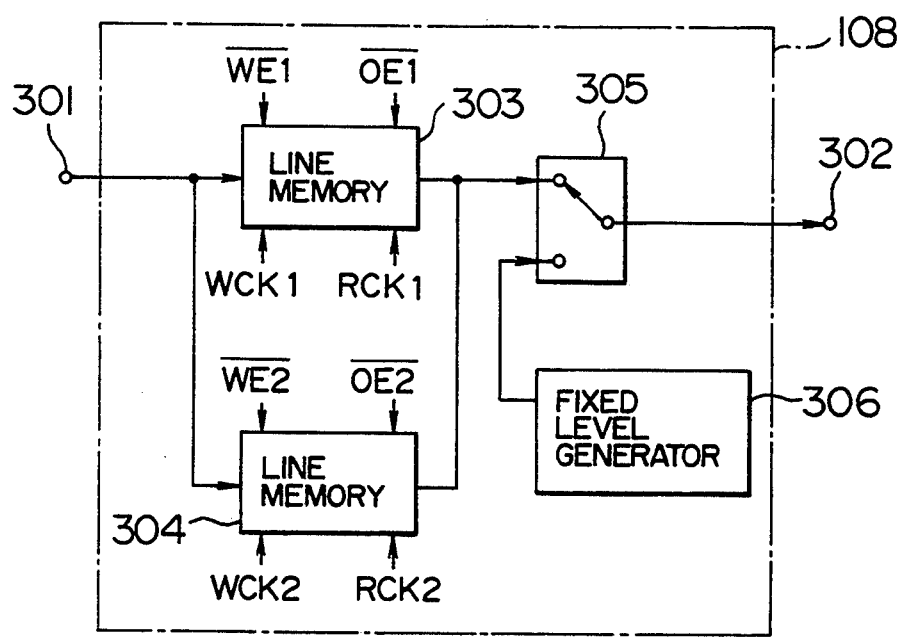
FIG. 3B is a block diagram showing the aspect ratio conversion circuit.

FIG. 3B is a block diagram illustrating an example of the aspect ratio conversion circuit 108. In FIG. 3B, the aspect ratio conversion circuit 108 includes an input terminal 301 supplied with a double scanning speed NTSC signal from the IDTV processor 105, an output terminal 302 for outputting the signal after aspect ratio conversion, first and second line memories 303 and 304, a first switching circuit 305 for inserting a blanking signal, and a fixed level generation circuit 306 for generating a fixed level for determining a signal level in a blanking period.

Figure 3C:
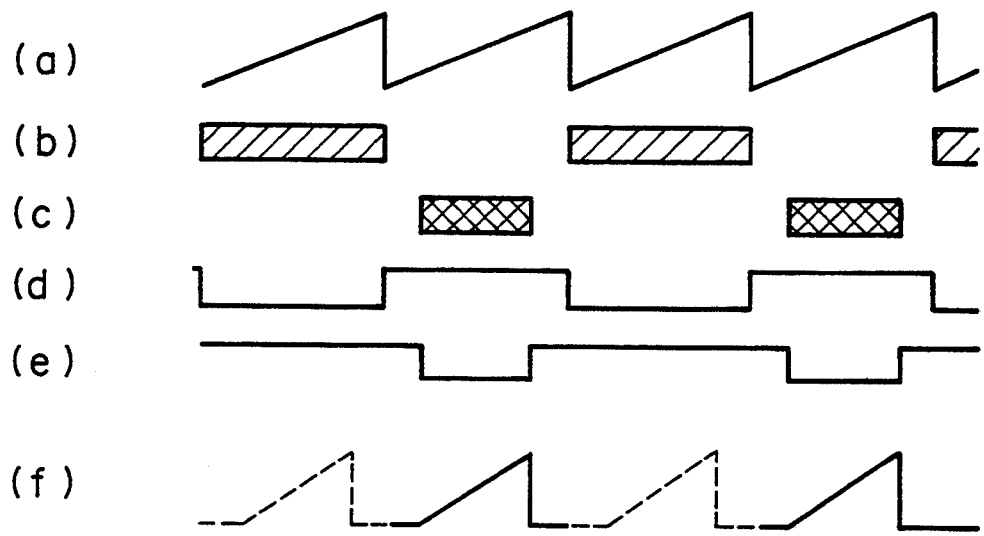
FIG. 3C is a diagram showing operation waveforms in aspect ratio conversion.

FIG. 3C is a diagram showing the operation timing of the aspect ratio conversion circuit 108.

In FIG. 3C, the diagram (a) shows an example of a signal supplied to the input terminal 301, that is, supplied to each of the first and second line memories 303 and 304, the diagram (b) shows a write clock (WCK1) for the first line memory 303, the diagram (c) shows a read clock (RCK1) for the first line memory 303, the diagram (d) shows a write control signal (RE1) for the first line memory 303, the diagram (e) shows a read control signal (RE1) for the first line memory 303, and the diagram (f) shows an output signal supplied to the output terminal 302.

At this time, the frequency of the memory read clock is made to be 4/3 times of the memory write clock to compress the picture. The same applies to the second line memory 304 except that the signal timing of all the signals shown in the diagrams (b) through (e) are shifted by a time corresponding to one line. Accordingly, the first and second line memories 303 and 304 operate alternately line by line. Further, the fixed level signal is inserted in part of the picture plane which becomes vacant because of compression of the displayed picture so that it is made possible to display an NTSC signal in such a manner as shown in FIG. 3A.

At this time, it is not always necessary to make the signal to be inserted in the blanking period have a fixed level by use of the fixed level generation circuit 306 as shown in FIG. 3B, and it is possible to insert another video signal. Further, the position of the blanking area is not limited to the horizontally opposite sides in the picture plane but it may be located at one side, namely, at the left or right side, or the blanking area may be made to have a asymmetric width.

Returning to FIG. 1, since the EDTV signal has a wide aspect ratio of 16:9 at the point of time when it is outputted from the EDTV processor 106, it is not necessary to convert the aspect ratio of the signal. The switching circuit 109 for switching the EDTV signal and the standard signal is controlled by a detection signal which is supplied from the EDTV signal detection circuit 107 upon detection of the EDTV signal.

The EDTV signal is detected by using a discrimination signal inserted in the vertical blanking period for discriminating the EDTV signal from any other signal. The circuit for detecting the EDTV signal is the EDTV signal detection circuit 107. Accordingly, if the output signal of the EDTV signal detection circuit 107 is used as a control signal, it is possible to make the switching circuit 109 automatically operate its switching operation.

The display 110 having a wide aspect ratio of 16:9 is in synchronism with the double scanning speed NTSC signal.

This embodiment has a novel effect that a standard signal and an EDTV signal having a wide aspect ratio can be automatically switched so that selected one of those signals can be displayed in the display having a wide aspect ratio. Because a user is not required to take any part in judging whether an input signal is an EDTV signal or not, the system is a convenient one to use.

FIG. 4 illustrates another embodiment of the present invention. In FIG. 4, the system includes an input terminal (hereinafter referred to as a "S input terminal") 401 supplied with a television signal for a VTR of the Y/C separation type which will be described later, a wide picture-plane discrimination signal detection circuit 402 for detecting a wide picture-plane discrimination signal when the wide picture-plane discrimination signal is multiplexed on the above-mentioned signal for the VTR, switching circuits 403 and 406, a signal format conversion circuit 404, a wide picture-plane discrimination signal application circuit 405, an S signal encoder 407 for forming a component type television signal in which a luminance signal and a color signal are separated from each other for delivery of a high definition video signal (a signal for a Y/C separation type VTR which is hereinafter referred to as an "S signal"), that is, for outputting an input signal after conversion of the signal format of the input signal into that for the VTR, and an output terminal 408 for supplying a Y/C separation type signal for VTR recording to a not-shown ordinary standard system VTR. Other parts are the same as those in the embodiment of FIG. 1.

In this embodiment of FIG. 4, ground broadcasting signals and satellite broadcasting are subject to signal processing in the IDTV processor 105 and the EDTV processor 106, respectively, after being tuned in the tuners 103 and 104, respectively, in the same manner as in the embodiment of FIG. 1.

In the embodiment of FIG. 1, each of the IDTV processor 105 and the EDTV processor 106 outputs a signal doubled in scanning speed. In a practical case, however, a standard scanning speed signal may be derived from each of the IDTV processor 105 and the EDTV processor 106. This state will be briefly described with reference to FIGS. 5 and 6.

FIG. 5 shows an example of the IDTV processor 105. In FIG. 5, the IDTV processor 105 includes an input terminal 501 supplied with a video signal, an output terminal 502 for outputting the video signal doubled in scanning speed, another output terminal 503 for outputting the video signal of a standard scanning speed, an A/D converter 504, a movement adaptation Y/C separation circuit 505, a movement adaptation scanning line interpolation circuit 506, a double scanning speed conversion circuit 507, and a synchronization processing circuit 508.

Figure 6:
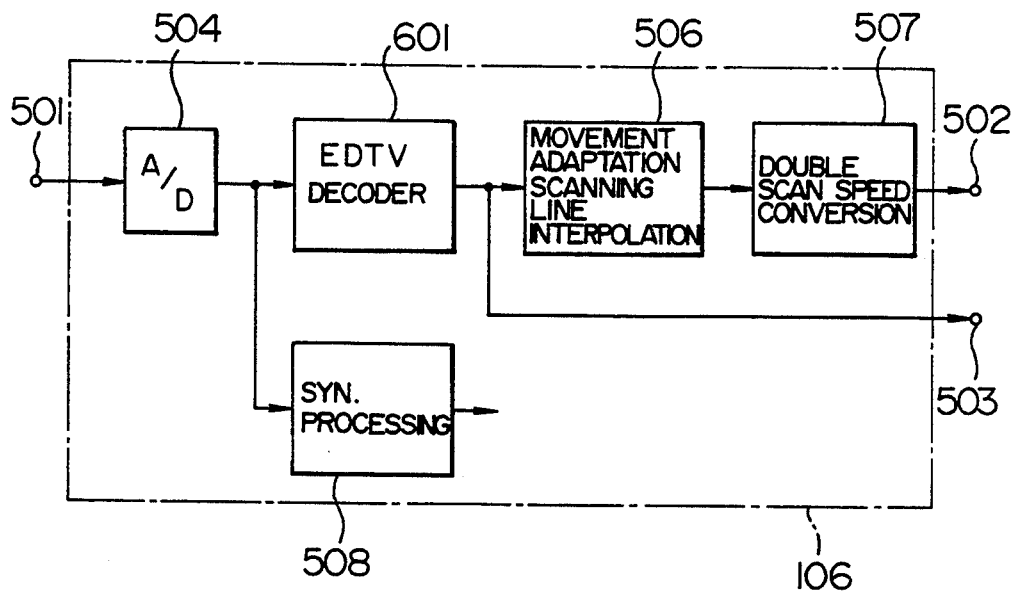
FIG. 6 is a block diagram illustrating an example of the configuration of the EDTV processor in FIG. 4.

FIG. 6 shows an example of the EDTV processor 106. In FIG. 6, the EDTV processor 106 includes an EDTV decoder 601 and other parts the same as those in the configuration of FIG. 6.

In the configuration of each of FIGS. 5 and 6, an input video signal is subject to signal processing after being converted into a digital signal in the A/D converter. The movement adaptation Y/C separation circuit 505 adaptationally switches an inter-frame filter and an intra-frame filter in accordance with the movement of a picture. By this processing, luminance and color difference signals having no disturbance can be obtained with respect to a still picture. The movement adaptation scanning line interpolation circuit 506 adaptationally switches between an inter-field interpolation and an intra-field interpolation in accordance with the movement of a picture.

By this processing, luminance and color difference signals which are greatly improved in vertical resolution can be obtained with respect to a still picture. An actual scanning line signal obtained from the movement adaptation Y/C separation circuit 505 and a double scanning speed signal obtained by doubling the scanning speed of an interpolated scanning line signal produced from the movement adaptation scanning line interpolation circuit 506 are outputted through the output terminals 503 and 502, respectively.

In the configuration of FIG. 6 the EDTV processor 601 performs movement adaptation Y/C separation, signal processing for improving the horizontal resolution, and wide picture plane signal decoding. Other processing is performed in the same manner as in the configuration of FIG. 5.

Accordingly, each of the IDTV processor 105 and the EDTV processor 106 can output a double scanning speed signal and a standard scanning speed signal. The standard scanning speed signal outputted from the EDTV processor 106 is multiplexed with a wide picture-plane discrimination signal in the wide picture-plane discrimination signal application circuit 405 so as to make it possible to detect the fact that this signal is a wide picture plane signal to cope with the reproduction in an ordinary VTR of the standard system.

The application of the wide picture-plane discrimination signal can be realized, for example, by multiplexing a special luminance signal pulse or a special color signal pulse in the vertical blanking period. The position of multiplexing of the wide picture-plane discrimination signal is not limited in the vertical blanking period, but even if the wide picture-plane discrimination signal is multiplexed in the video period corresponding to an overscan region which is not displayed on the cathode ray tube, there occurs no problem.

Further, in the case where the EDTV discrimination signal can be recorded and reproduced in the VTR, the EDTV discrimination signal may be used also as the wide picture-plane discrimination signal. In this case, there is an advantage in reduction of the circuit scale.

Next, the standard scanning speed signal from the IDTV processor 105 and the standard scanning speed signal from the EDTV processor 106, to which is added the discrimination signal in the wide picture-plane discrimination signal application circuit 405, are switched by the switching circuit 406 so as to select one of those signals which is then supplied to the S signal encoder 407. At this time, if the output signal of the EDTV signal detection circuit 107 is used as a control signal for the switching circuit 406, the switching operation of the switching circuit 406 can be performed automatically.

The S signal encoder 407 supplies the input signal from the switching circuit 406 into the S output terminal 408 after the encoder 407 has formed processing such as burst signal application, band restriction, etc. on the input signal and arranged the format of the input signal as a signal to be recorded in the not-shown VTR.

In the case where the signal thus recorded in the not-shown VTR is to be reproduced, the reproducing signal is supplied through the S input terminal 401 to the IDTV processor 105 in which the input signal is subject to processing. This signal may be one of a wide aspect ratio signal and a standard aspect ratio signal. Accordingly, the input signal is discriminated to determine whether it is a wide aspect ratio signal or not in the wide picture-plane discrimination signal detection circuit 402.

When the input signal is a wide aspect ratio signal, it is not necessary to perform aspect ratio conversion, and therefore, the contact of the switching circuit 403 is switched to the upper side in the drawing so as to pass the input wide aspect ratio signal as it is. In the case where the input signal is a standard aspect ratio signal, on the contrary, the input signal is subject to aspect ratio conversion in the same manner as in the embodiment of FIG. 1 and is then displayed as a picture having an aspect ratio of 4:3 in the picture plane of the display 110 having a display aspect ratio of 16:9.

According to this embodiment, it is possible to receive either a standard television signal and an EDTV signal so as to display the received signal in the display 110 having a wide aspect ratio of 16:9. Further, there is an advantage that a signal having a wide aspect ratio can be recorded as it is while keeping its state of wide aspect ratio in an ordinary VTR employing the standard system and the signal can be reproduced as it is while keeping its state of wide aspect ratio.

Figure 7:
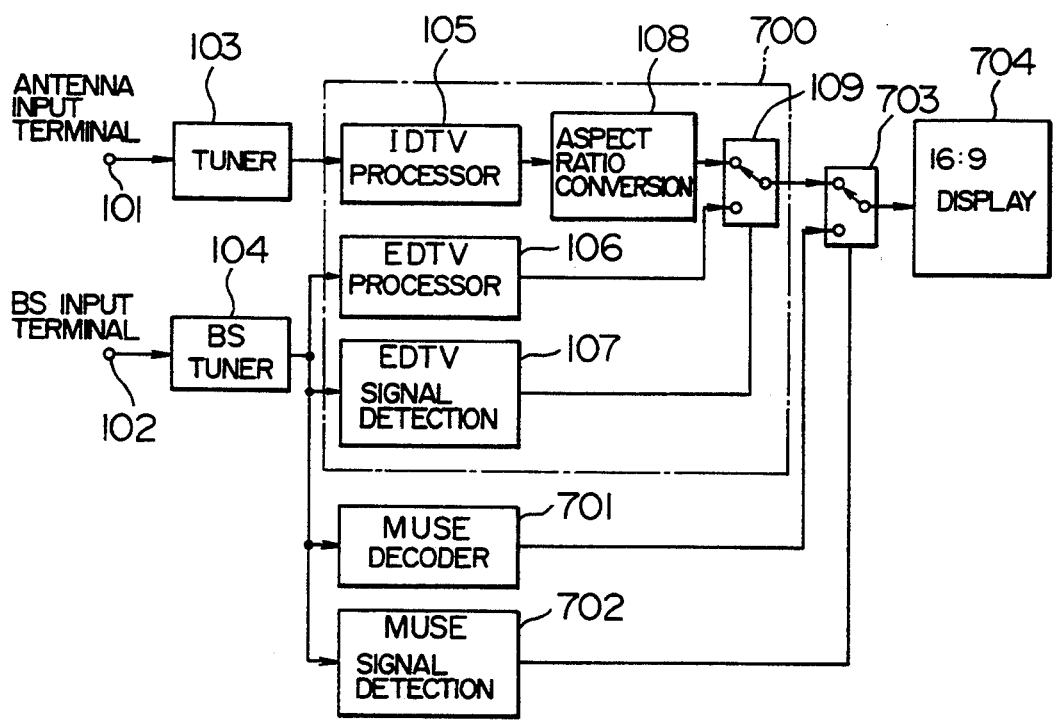
FIGS. 7 and 8 are block diagrams illustrating further embodiments of the present invention.

FIG. 7 illustrates a further embodiment of the present invention. In FIG. 7, the system includes a television signal scanning speed doubling processing circuit 700, a MUSE decoder 701, a MUSE signal detection circuit 702, a switching circuit 703, a display 704 which can be in synchronism with the double speed scanning frequency of an NTSC signal and the scanning frequency of an MUSE signal and which has a wide aspect ratio of 16:9, the other parts being the same as those in the embodiment of FIG. 1.

This embodiment is different from the embodiment of FIG. 1 in that in this embodiment the display having an wide aspect ratio of 16:9 can cope with an MUSE signal. In the MUSE decoder 701, an interlacing signal having 1125 scanning lines and a frame frequency of 30 Hz is reproduced as described above. The MUSE signal detection circuit 702 detects the existence of an MUSE signal to thereby control the switching circuit 703, for example, on the basis of whether the reproducing synchronization of the MUSE decoder is locked with the input signal or not.

Accordingly, when an input signal is a MUSE signal, the contact of the switching circuit 703 is connected to its under side in the drawing so that the MUSE signal is displayed in the display 704. When no MUSE signal comes in, the contact of the switching circuit 703 is connected to its lower side in the drawing so that an NTSC signal or an EDTV signal is displayed on the display 704.

Further, in an actual system, a switching control circuit (not shown) is provided so that the switching circuits 109 and 703 can be switch-controlled in response to a user's selection on the tuners 103 and 104 or a user's channel selection with priority to the control signals from the EDTV signal detection circuit 107 and the MUSE signal detection circuit 702. However, the substantial or essential circuit configuration of the system is as shown in FIG. 7.

Although an embodiment has been described as to the television signal scanning speed doubling processing circuit 700 such that the circuit 700 can perform processing both on an NTSC signal and an EDTV signal, the present invention is effective also in the case where the circuit 700 has a configuration in which the circuit 700 can perform processing only on either an NTSC signal or an EDTV signal.

Thus, in this embodiment, there is an advantage that the arrival of an NTSC signal and a MUSE signal can be automatically detected so as to be displayed on one and the same display.

Figure 8:
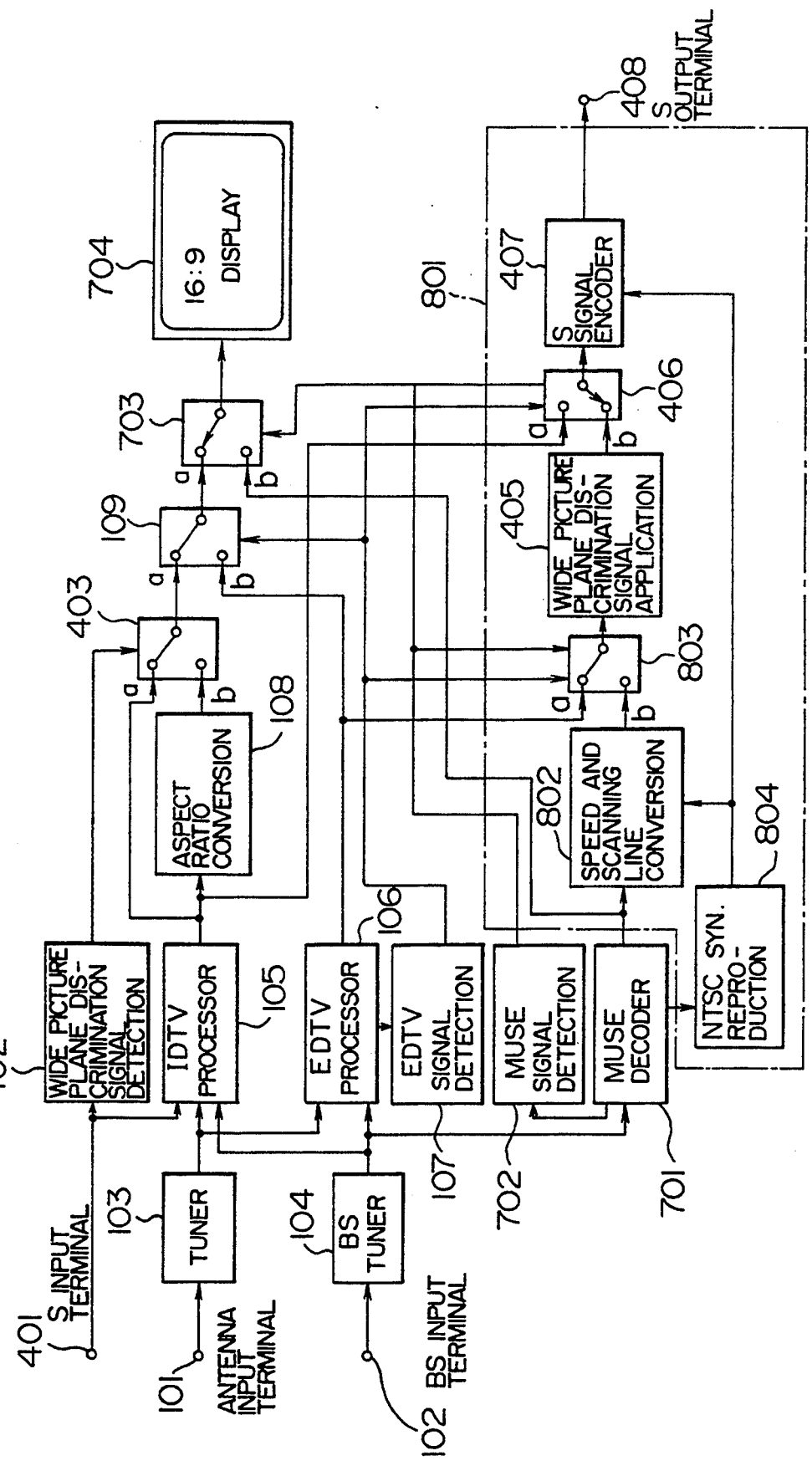

FIG. 8 illustrates a still further embodiment of the present invention. In FIG. 8, the system includes a signal format conversion circuit 801 for converting the signal format of an EDTV signal or a MUSE signal into a signal format for a VTR, a scanning speed and scanning line number conversion circuit 802 for converting the scanning speed and the number of scanning lines of a MUSE signal into those of a NTSC signal, a switching circuit 803, a NTSC synchronizing signal reproduction circuit 804 for reproducing a NTSC synchronizing signal from a MUSE signal, other parts being the same as those in the embodiments of FIGS. 1, 4, and 7.

In FIG. 8, the operation upon reception of a NTSC signal and an EDTV signal is the same as that in the embodiment of FIG. 4.

When a MUSE signal is received at the input terminal for satellite broadcasting, that is, the BS input terminal 102, the MUSE decoder 701 operates so as to obtain MUSE luminance and color difference signals in this embodiment. When a MUSE signal is being received, the contact of the switching circuit 703 is connected to the b side by the output of the MUSE signal detection circuit 702 so that the MUSE luminance and color difference signals are displayed on the display 704 of a wide aspect ratio of 16:9, as described in the embodiment of FIG. 7.

Further, the circuit connection is made in the following manner so as to cope with the foregoing problems concerning recording and reproducing.

The signal format conversion circuit 801 is provided for converting the signal format or specification for each of a MUSE signal and an EDTV signal into the signal format or specification for a NTSC signal. Generally, the conversion can be realized by vertically low-pass filtering to thereby reduce the number of scanning lines.

FIG. 9 shows the state of extremely simple conversion of the number of scanning lines. FIG. 9 is a conceptual side view showing a scanning line structure. That is, scanning lines in a first field before conversion are simply eliminated on every other line to thereby form a new first field after conversion, and two adjacent upper and lower scanning lines in a second field before conversion are averaged to form one scanning line after conversion to thereby form a new second field. As a result, the number of scanning lines before conversion is halved.

At this time, writing into the scanning speed and scanning line number conversion circuit 802 is performed in accordance with a synchronizing signal of a MUSE signal, while reading from the scanning speed and scanning line number conversion circuit 802 is performed in accordance with a synchronizing signal of the NTSC system. The NTSC synchronizing signal is reproduced from a MUSE synchronizing signal by means of the NTSC synchronizing signal reproduction circuit 804.

Further, the wide picture plane discrimination signal application circuit 405 inserts a wide picture plane discrimination signal in order to cope with a case of reproduction by means of a VTR. The switching circuit 406 is connected to the side b by the respective control signals from the EDTV signal detection circuit 107 and the MUSE signal detection circuit 702, and the output signal of the switching circuit 406 is outputted through the S output terminal 408 as a component-system television signal after the output signal is subjected to burst signal application, field limitation, and the like, by means of the S signal encoder 407.

Figures 13, 14:
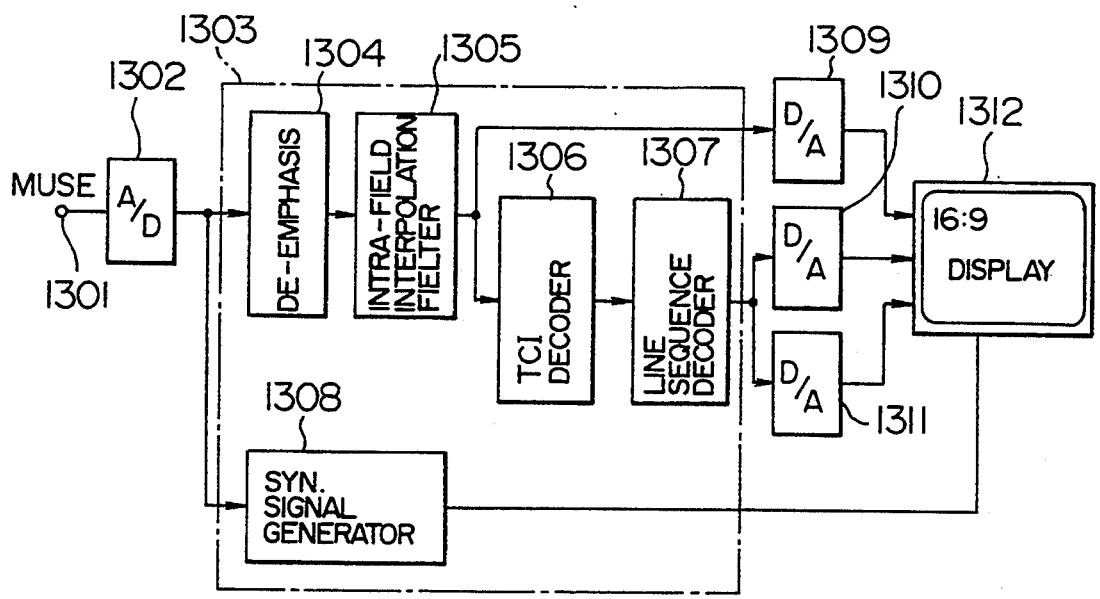

Here, the above-mentioned NTSC synchronizing signal reproduction circuit 804 will be further described in detail. FIG. 14 shows a table of comparison in specification between the MUSE system and the NTSC system. A necessary condition is that an output signal at the time of recording in a VTR is in synchronism with a MUSE signal. FIG. 15 shows a numerical value relationship which enables a NTSC synchronizing signal to be relatively easily produced from a MUSE synchronizing signal. If the relationship between a MUSE horizontal synchronizing signal and a NTSC horizontal synchronizing signal can be represented by a simple integer ratio, a NTSC reference clock can be comparatively easily reproduced by using a PLL (phase-locked loop) circuit.

Further taking into consideration the relationship of interlacing, the rate of a video signal occupied a horizontal scanning period, etc., it is found from FIG. 15 that it is desirable to select the NTSC reference clock frequency to be 14.175 MHz (see the row No. 5 in FIG. 15) which is 7/8 times as high as the MUSE reference clock frequency of 16.2 MHz (see, also the row Nos. 2 and 8 in FIG. 15).

Figure 10A:
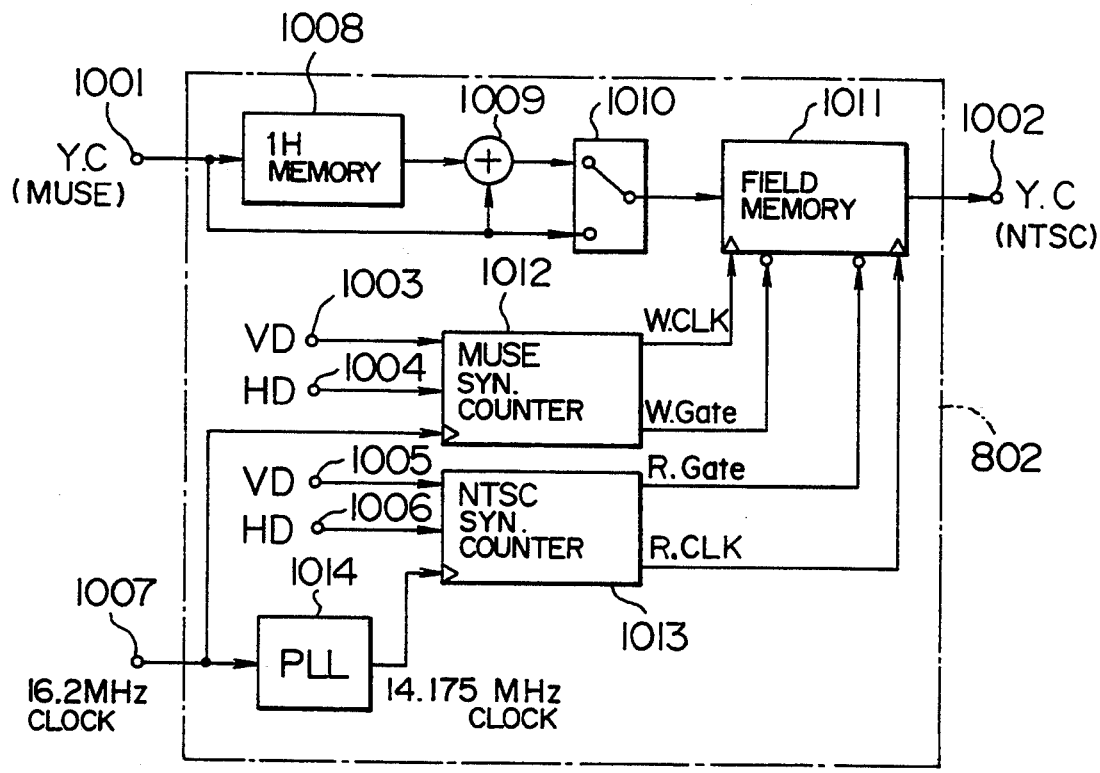
FIG. 10A is a block diagram illustrating an example of the configuration of the scanning speed and scanning line conversion circuit.
Figure 10B:
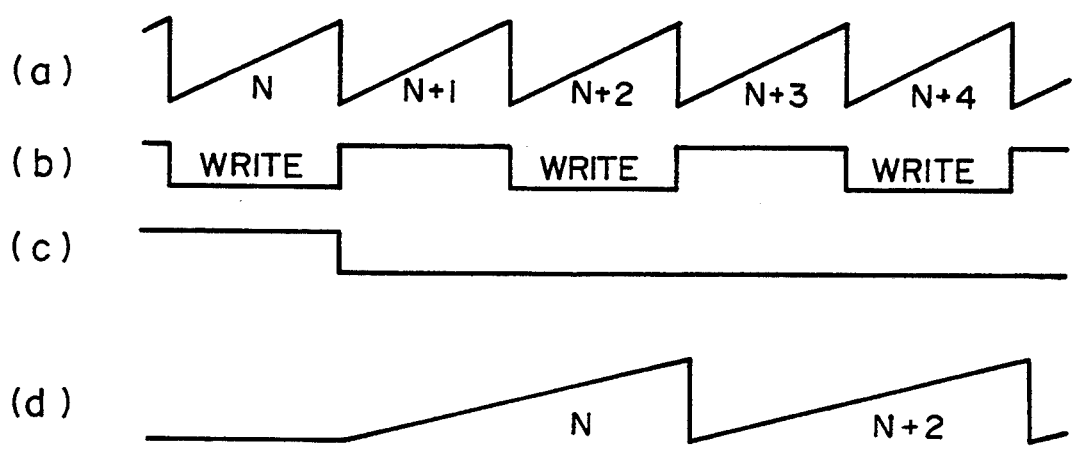
FIG. 10B is a diagram showing operation waveforms in the circuit of FIG. 10A.

FIG. 10A and 10B show an example of a simple configuration of the scanning speed and scanning line number conversion circuit 802. In FIG. 10A, the scanning speed and scanning line number conversion circuit 802 includes an input terminal 1001 for receiving luminance and color difference signals of the MUSE system, an output terminal 1002 for outputting luminance and color difference signals of the NTSC system, input terminals 1003 and 1004 for receiving vertical and horizontal synchronizing signals of the MUSE system, input terminals 1005 and 1006 for receiving vertical and horizontal synchronizing signals of the NTSC system, a clock signal 1007 for the MUSE system, a 1H memory ("1H" representing one scanning line) 1008, an adder 1009; a switching circuit 1010 for switching an input signal from the input terminal 1001 and an output signal from the adder 1009 for every field, a field memory 1011, a MUSE synchronizing counter 1012 for generating a writing control signal for the field memory 1011, a NTSC synchronizing counter 1013 for generating a reading control signal for the field memory 1011, and a PLL circuit 1014 for simply generating a NTSC clock signal from a MUSE clock signal from the input terminal 1007.

A luminance or color difference signal of the MUSE system being supplied through the input terminal 1001 and having a horizontal scanning frequency of 33.75 kHz is processed by the 1H memory 1008 and the adder 1009 in a manner so that two adjacent upper and lower scanning lines are averaged to obtain a mean value. In the actual case, the output of the adder 1009 is halved to thereby obtain a mean value. In the case of a digital adder, however, the output of the adder can be easily halved only by shifting the output of the adder by one bit and therefore no halving circuit is illustrated in the drawing. The switching circuit 1010 switches at every field so as to pass the input signal supplied through the input terminal 1001 and the output signal of the adder 1009 alternately for every field.

The field memory 1011 operates as a buffer memory so as to convert the signal being supplied thereto and having a horizontal scanning frequency of 33.76 kHz into a signal having a horizontal scanning frequency of 15.75 kHz. FIG. 10B shows the timing at this time.

In FIG. 10B, the diagram (a) shows an input signal, the diagram (b) shows a pulse (W.Gate) for gating a writing clock (W.CLK) so that writing is performed only in a low-level period, the diagram (c) shows a pulse (R.Gate) for gating a reading clock (R.CLK) so that reading is performed only in a low-level period, and the diagram (d) shows an output signal of the field memory 1011.

As described above, the number of scanning lines can be removed on every other line. At this time, a NTSC clock signal, that is, a reading clock signal (R.CLK), can be easily reproduced from a MUSE clock by using the PLL circuit 1014. In the foregoing method, however, the number of scanning lines is simply halved to 1125/2, and it is therefore necessary to further remove the scanning lines at upper and lower portions so as to make the number of scanning lines be 525. This removal of the scanning lines can be easily controlled at the signal insertion timing shown in the diagram (c) of FIG. 10B.

Next, the limitation of a horizontal signal frequency band will be considered. Although a MUSE signal has a horizontal signal frequency band of about 20 MHz at maximum in still picture transmission, the frequency band is reduced to about 9 MHz by the scanning speed and scanning line number conversion circuit 802. Since the recordable/reproducible frequency band of a signal to be used in a VTR of the S-VHS system is about 5 MHz as described above, the frequency band is further limited to 5 MHz. When a signal of about 5 MHz is displayed on a display having an aspect ratio of 16:9, the horizontal resolution of the displayed picture is about 300 scanning lines.

If recording/reproducing is performed in the foregoing system, therefore, a MUSE signal can be recorded by using a VTR coping with a current S signal, and the horizontal resolution of a reproduced picture is only slightly inferior to that of a current NTSC signal. Further, as compared to a down converter, there is no defect that a picture is cut at its opposite ends and the vertical resolution is extremely deteriorated.

This is because the video signal supplied through the S terminal again is processed to have a high-definition by the IDTV processor and then passed through the aspect ratio conversion circuit 108 of FIG. 8 to make the aspect ratio return to the original value of 16:9.

If the frequency band limitation of a signal is performed by the S signal encoder 407, the limitation can be realized by a simple circuit configuration with an analog filter. Alternatively, the frequency band limitation may be performed at the succeeding stage of the switching circuit 803 or the like.

A discrimination signal is multiplexed on an output signal from the scanning speed and scanning line number conversion circuit 802 by means of the wide picture plane discrimination signal application circuit 405 for discriminating the output signal from an ordinary NTSC signal. If a pulse having a special width is multiplexed, for example, on the 260-th line in a vertical blanking period, the pulse is detected to thereby make it possible to perform discrimination of the signal from a wide picture plane signal.

In this embodiment, there are advantages in that an input signal is automatically detected in spite of whether the input signal is a NTSC signal, an EDTV signal, or a MUSE signal, to thereby obtain a high-definition reproduced signal, in that the format of any of those NTSC, EDTV and MUSE signals can be converted so that the signal can be recorded in a VTR, and in that a wide picture plane signal among signals recorded in a VTR can be reproduced as it is with the wide picture plane.

FIG. 11 shows another embodiment of the present invention. In FIG. 11, the system includes a television signal scanning speed doubling processing circuit 1100 constituted by an IDTV processor 1101 having a movement adaptation Y/C separation circuit 1101, an EDTV processor 1102 for widening an aspect of a picture plane and for improving the horizontal resolution, and a double scanning speed conversion circuit 1103 for performing movement adaptation scanning line interpolation. The system further includes a display 1104 having an aspect ratio of 16:9 which is able to be in synchronism with the double speed scanning frequency of a NTSC signal and the scanning frequency of a MUSE signal. Other portions in FIG. 11 are the same as those in the embodiments of FIGS. 1, 4, 7, and 8.

The contents of this embodiment are substantially the same as those of the embodiment of FIG. 8. Although the IDTV and EDTV processors 105 and 106 are arranged in parallel to each other in the foregoing embodiments, in an actual case the IDTV and EDTV processors 105 and 106 have parts performing the same operation in signal processing, and it can be therefore expected to provide the processors as a common circuit.

As shown in FIGS. 5 and 6, it may be considered that the EDTV processor 106 is provided with a function of signal processing for performing widening of the picture plane and a function of signal processing for improving the horizontal resolution in addition to the function of signal processing of the IDTV processor 105. In this point of view, the IDTV processing and the EDTV processing are performed by one and the same processing system in this embodiment.

In the embodiment of FIG. 11, the IDTV processor 1101 performs movement adaptation Y/C separation to thereby remove a harmful component peculiar to the NTSC system, and the EDTV processor 1102, on the other hand, performs demodulation of a signal for a wide picture plane and modulation of a high definition signal for improving the horizontal resolution. The double scanning speed conversion circuit 1103 forms interpolation scanning lines from the output signals of the IDTV processor 1101 and the EDTV processor 1102, and performs movement adaptation scanning line interpolation processing so as to attain high definition. The other circuit operation is the same as that of the embodiment of FIG. 8.

Although this embodiment has been described so that the system has a configuration capable of processing any input signal in spite of whether the input signal is a NTSC signal, an EDTV signal, or a MUSE signal, the present invention is effective also in the case where the configuration can perform processing on only one or two of those NTSC, EDTV and MUSE signals. Further, in this embodiment, it can be expected to reduce the circuit scale by making circuit portions common to the IDTV signal processing and the EDTV signal processing to be used commonly.

Figure 12:
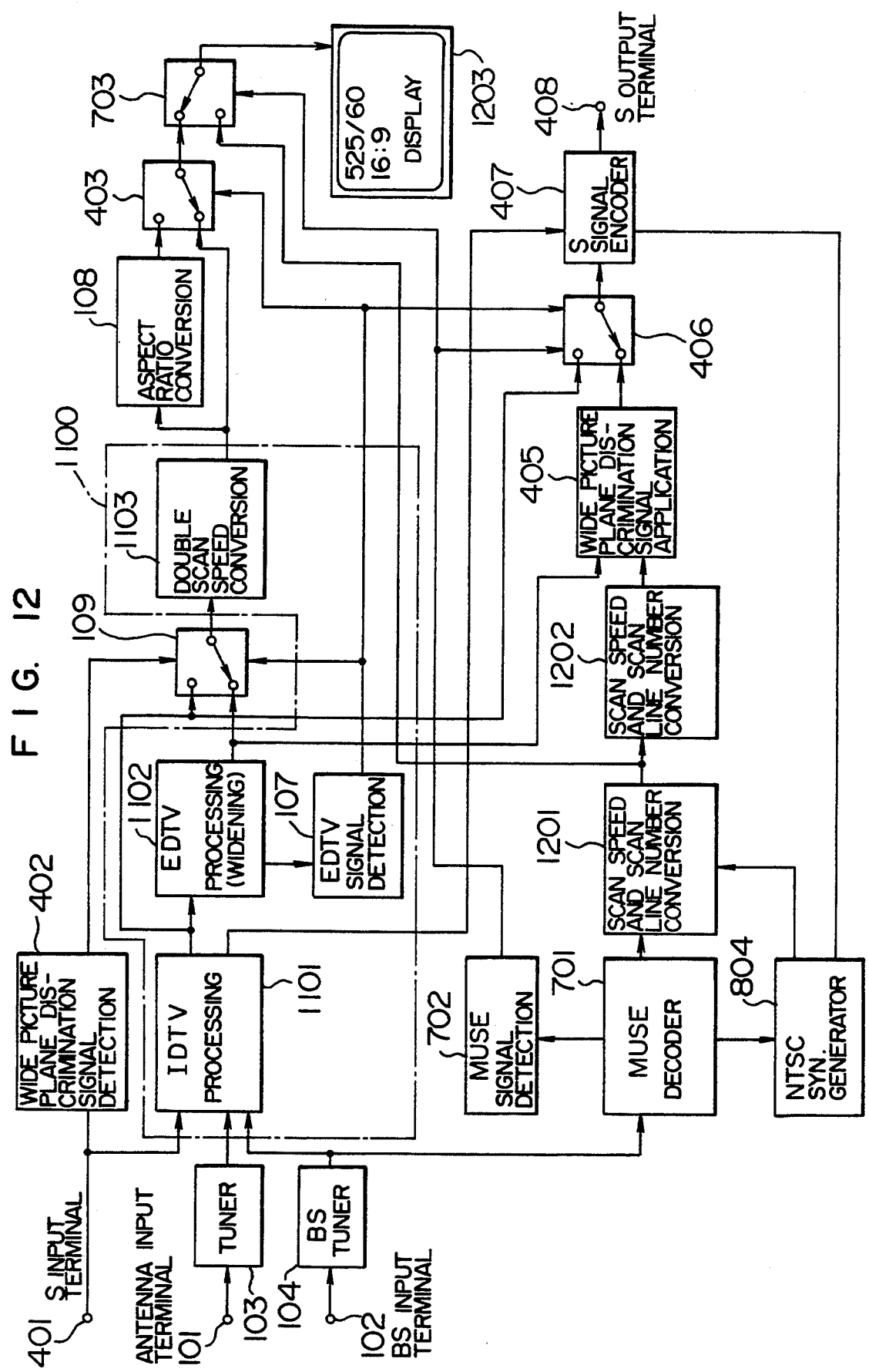

FIG. 12 shows a further embodiment of the present invention. In FIG. 12, the system includes a first scanning speed and scanning line number conversion circuit 1201, a second scanning speed and scanning line number conversion circuit 1202, and a display 1203 which is in synchronism with the double speed scanning frequency of a NTSC signal and having an aspect ratio of 16:9. Other portions in FIG. 12 are the same as those in the embodiment of FIG. 11.

This embodiment is different from that of FIG. 11 in that the display 1203 is in synchronism only with the double speed scanning frequency of a NTSC signal. That is, this embodiment can not cope with a signal, such as a MUSE signal, which operates with a horizontal synchronizing frequency of 33.75 kHz. It is therefore necessary to make a small adjustment with respect to a MUSE signal.

First, if the 1125 scanning lines are eliminated a little to 1050 at the upper and lower sides thereof in the first scanning speed and scanning line number conversion circuit 1201, the horizontal synchronizing frequency becomes 31.5 kHz so that interlacing display is made possible. The processing for performing reduction of the number of scanning lines 1050 is performed by the first scanning speed and scanning line number conversion circuit 1201. Although the processing can be realized in the same way as that of FIG. 10, it is necessary that a reading clock produced from a PLL circuit has a frequency of 28.35 MHz which is 7/8 times as high as 32.4 MHz. By the foregoing processing, it is made possible to perform interlacing display of 1050 scanning lines on the display 1203.

In this embodiment, in the case of recording a television signal in a VTR, it is necessary to further provide the second scanning speed and scanning line number conversion circuit 1202. In the second scanning speed and scanning line number conversion circuit 1202, a signal processed in the first scanning speed and scanning line number conversion circuit 1201 so as to have 1050 scanning lines and a horizontal scanning frequency of 31.5 kHz is further processed in a manner so that the number of scanning lines is halved to 525 and the horizontal scanning frequency is lowered to 15.75 kHz. The second scanning speed and scanning line number conversion circuit 1202 can be realized relatively easily by the circuit configuration of FIG. 10.

After having added therein a wide picture plane discrimination signal, a burst signal, and so on, the MUSE signal converted into a NTSC signal in the second scanning speed and scanning line number conversion circuit 1202 is recorded in a VTR. The other circuit operation of this embodiment is the same as that of the embodiment of FIG. 11.

According to this embodiment, even in the case where the display is in synchronism only with a double scanning speed NTSC signal, any of MUSE, NTSC and EDTV signals can be displayed, and can be recorded and reproduced in a VTR.

In the embodiments of FIGS. 11 and 12, the switching circuits 109, 403, 703, and 406 are provided with control circuits for enabling a user to select one of the S input terminal, the tuner 103 and the tuner 104 so that the switching circuits 109, 403, 703, and 406 are switched by the control circuits in the same manner as in the case of FIG. 8. However, the essential flow of control signals is as shown in FIGS. 11 and 12.

The embodiments described above have one common feature in that the system can cope with any of NTSC, EDTV and MUSE signals. In this case, however, there is a problem in that an MUSE receiver, which is estimated to be considerably expensive even though it is provided as a unit, is built in each system. It is therefore sure that the system per se is considerably expensive as a whole, and so how to reduce the cost of the system is one of the important points. In the foregoing embodiments, the portion in which large cost-reduction can be expected is the processing system inside of the MUSE decoder. Next, description will be made as to simplification of the inside of the MUSE decoder.

One means for realizing the cost-reduction of the MUSE decoder is a down converter as described as the conventional technique. The down converter, however, has a problem impermissible as a High-Vision display device that the vertical resolution is remarkably deteriorated while a signal according to the NTSC system is made to have high-definition as an EDTV signal or the like. FIG. 13 shows a simple MUSE decoder having a configuration which is directed to minimize deterioration of resolution and generation of harmful components and to attain a considerably large cost reduction.

In FIG. 13, the system includes: an input terminal 1301 for receiving a MUSE signal; an A/D converter 1302 for digitizing a MUSE signal; a digital signal processing portion 1303 of the simple MUSE decoder constituted by a de-emphasis processing portion 1304, an intra-field interpolation filter 1305, a chrominance component time-base expansion processing portion (hereinafter, referred to as a "TCI decoder"), a line sequence decoder 307, and a synchronizing signal generator 1308; A/D converters 1309 through 1311 for converting luminance and color signals into analog signals again; and a display 1312 having an aspect ratio of 16:9.

In the simple MUSE decoder of FIG. 13, interframe or inter-field interpolation filtering processing which is generally performed in a still-picture processing portion is not performed, and both a still-picture portion and an animation portion are processed by the intra-field interpolation filter 1305. By this processing system, it becomes unnecessary to provide a frame memory and an inter-frame interpolation filter which are required to be used in an ordinary MUSE decoder or a complicated signal processing circuit such as a movement detection circuit or the like, so that an extremely simple signal processing circuit as shown in FIG. 13 can be realized.

The simple MUSE decoder of FIG. 13, however, does not convert the number of scanning lines unlike the down converter described in the conventional example. That is, in this simple decoder, what is taken into consideration is displaying a signal on a 16:9 display with 1125 scanning lines. Therefore, in the simple MUSE decoder, by means of a simple circuit configuration, it is possible to obtain a picture with vertical resolution which is remarkably improved in comparison with the case of using a down converter although the vertical resolution does not reach that in an ordinary MUSE decoder.

It is possible to use such a simple MUSE decoder 1303 in place of the MUSE decoder 701 used in the foregoing embodiments. Also in this case, both a wide picture plane signal such as an EDTV signal or a MUSE signal as well as a standard picture plane signal can be received and recorded/reproduced in a VTR. Further, this system can be realized at a relatively low cost.

In the foregoing embodiments, the following effects can be expected.

(1) Any of signals of the NTSC, EDTV and MUSE systems can be displayed on a display having a wide aspect ratio.

(2) Either of signals of the EDTV and MUSE systems can be recorded as it is while keeping a wide aspect ratio in an ordinary VTR employing the standard system.

(3) A signal of either of the EDTV and MUSE systems recorded in a VTR with a wide aspect ratio can be reproduced as it is while keeping the wide aspect ratio, and a signal recorded in a VTR with a standard aspect ratio can be reproduced as it is while keeping the standard aspect ratio.

(4) The kind of an input signal is automatically discriminated, and processing corresponding to the input signal can be automatically performed.

Although the discussion has been made with respect to a VTR as an apparatus for performing recording/reproducing by using a component signal in all the foregoing embodiments, the present invention is not limited to such a VTR, but is applicable to a domestic-use VTR if the resolution may be sacrificed. In this case, however, the horizontal resolution is two hundred and scores of scanning lines.

We claim:

1. A wide picture plane/standard picture plane television signal receiving apparatus capable of receiving a standard system television signal (A) and a wide screen television signal (B) having a wide picture plane aspect ratio and capable of selectively displaying a television picture according to either one of the television signals (A) and (B) on a displaying means having a wide aspect ratio, said apparatus comprising:

a television signal format converting means for converting said wide screen television signal (B) into a converted standard system television signal (C) having a standard television signal format with a wide picture plane aspect ratio;

a wide aspect discriminating signal application means for multiplexing said converted standard system television signal (C) with a discriminating signal by inserting said discriminating signal into the vertical blanking period of said converted standard system television signal (C) thereby indicating a wide picture plane aspect ratio to generate a standard system wide aspect television signal (D); and an output terminal for outputting said standard system wide aspect television signal (D) in which is multiplexed said wide aspect discriminating signal.

2. A wide picture plane/standard picture plane television signal receiving apparatus according to claim 10, further comprising:

a detecting means for detecting whether an input television signal is said wide screen television signal (B); and a switching means at least controlled by an output of said detecting means for switching between said standard system wide aspect television signal (D) and said standard system television signal (A).

3. A wide picture plane/standard picture plane television signal receiving apparatus according to claim 1, wherein said television signal format converting means is a scanning speed and scanning line conversion circuit for converting said wide screen television signal (B) into a signal (C) having a scanning speed and scanning line numbers of a standard television signal format such as the ratio of the picture signal in the horizontal scanning period of said wide screen television signal (B) to be generally as in the standard system television signal (A).

4. A wide picture plane/standard picture plane television signal receiving apparatus according to claim 1, wherein said wide aspect discriminating signal application means multiplexes said discriminating signal in the vertical retracing period of said converted standard system television signal (C).

5. A wide picture plane/standard picture plane television signal receiving apparatus according to claim 1, wherein said output terminal is luminance/chrominance separation type output terminal.

6. A wide picture plane/standard picture plane television signal receiving apparatus capable of receiving a standard system television signal (A) and a wide screen television signal (B) having a wide picture plane aspect ratio and capable of selectively displaying a television picture according to either one of the television signals (A) and (B) on a displaying means having a wide aspect ratio, said apparatus comprising:

a television signal format converting means for converting said wide screen television signal (B) into a converted standard system television signal (C) having a standard television signal format with a wide picture plane aspect ratio;

a wide aspect discriminating signal application means for multiplexing said converted standard system television signal (C) with a discriminating signal indicating a wide picture plane aspect ratio to generate a standard system wide aspect television signal (D);

an output terminal for outputting said standard system wide aspect television signal (D) in which is multiplexed said wide aspect discriminating signal;

wherein said wide screen television signal (B) is a high definition television signal;

a first signal processing means including at least an aspect ratio converting section for converting an aspect ratio of an inputted standard system television signal (A);

a second signal processing means for processing an input high definition television signal to thereby output a processed television signal;

a high definition television signal detection means for detecting an input high definition television signal; and a signal selection means for selecting one of the respective output signals of said first signal processing means and said second signal processing means on the basis of a detection output of said high definition television signal detection means to thereby supply the selected output signal to a wide aspect display.

7. A wide picture plane/standard picture plane television signal receiving apparatus capable of receiving a standard system television signal (A) and a wide screen television signal (B) having a wide picture plane aspect ratio and capable of selectively displaying a television picture according to either one of the television signals (A) and (B) on a displaying means having a wide aspect ratio, said apparatus comprising:

a television signal-format converting means for converting said wide screen television signal (B) into a converted standard system television signal (C) having a standard television signal format with a wide picture plane aspect ratio;

a wide aspect discriminating signal application means for multiplexing said converted standard system television signal (C) with a discriminating signal indicating a wide picture plane aspect ratio to generate a standard system wide aspect television signal (D);

an output terminal for outputting said standard system wide aspect television signal (D) in which is multiplexed said wide aspect discriminating signal;

wherein said wide screen television signal (B) is a EDTV signal;

a first signal processing means for performing at least scanning line interpolation processing onto an input standard system television signal to thereby output a double scanning speed television signal;

an aspect ratio conversion means for converting a display aspect ratio of said double scanning speed television signal supplied from said first signal processing means to thereby output said double scanning speed television signal with a converted display aspect;

a second signal processing means for performing processing on an input EDTV television signal to thereby output a double scanning speed television signal with a wide aspect ratio;

an EDTV signal detection means for producing a detection output when processing on the EDTV television signal is being performed in said second signal processing means; and a signal selection means for selecting one of the respective output signals from said aspect ratio conversion means and said second signal processing means on the basis of the detection output of said EDTV signal detection means to thereby output the selected output signal to said displaying means.

8. A wide picture plane/standard picture plane television signal receiving apparatus capable of receiving a standard system television signal (A) and a wide screen television signal (B) having a wide picture plane aspect ratio and capable of selectively displaying a television picture according to either one of the television signals (A) and (B) on a displaying means having a wide aspect ratio, said apparatus comprising:

a television signal format converting means for converting said wide screen television signal (B) into a converted standard system television signal (C) having a standard television signal format with a wide picture plane aspect ratio;

a wide aspect discriminating signal application means for multiplexing said converted standard system television signal (C) with a discriminating signal indicating a wide picture plane aspect ratio to generate a standard system wide aspect television signal (D);

an output terminal for outputting said standard system wide aspect television signal (D) in which is multiplexed said wide aspect discriminating signal;

a first signal processing means including at least an aspect ratio converting means for converting an aspect ratio of an input standard television signal;

a television signal input terminal for inputting a television signal to said first signal processing means;

a wide aspect discrimination signal detecting means for discriminating said wide aspect discriminating signal multiplexed with said television signal inputted from said television signal input terminal to detect whether said standard system television signal is a signal having a standard picture plane aspect ratio of 4:3 or a signal having a wide aspect ratio; and an aspect ratio switching means for stopping the conversion operation of said aspect ratio converting means when said wide aspect discrimination signal detecting means detects inputting said standard system wide aspect television signal (D).

9. A wide picture plane/standard picture plane television signal receiving apparatus capable of receiving a standard system television signal (A) and a wide screen television signal (B) having a wide picture plane aspect ratio and capable of selectively displaying a television picture according to either one of the television signals (A) and (B) on a displaying means having a wide aspect ratio, said apparatus comprising:

a television signal format converting means for converting said wide screen television signal (B) into a converted standard system television signal (C) having a standard television signal format with a wide picture plane aspect ratio;

a wide aspect discriminating signal application means for multiplexing said converted standard system television signal (C) with a discriminating signal indicating a wide picture plane aspect ratio to generate a standard system wide aspect television signal (D);

an output terminal for outputting said standard system wide aspect television signal (D) in which is multiplexed said wide aspect discriminating signal;

a first signal processing means including at least an aspect ratio converting means for converting an aspect ratio of an input standard television signal;

a television signal input terminal for inputting a television signal to said first signal processing means;

a wide aspect discrimination signal detecting means for discriminating said wide aspect discriminating signal multiplexed with said television signal inputted from said television signal input terminal to detect whether said standard system television signal (A) is a signal having a standard picture plane aspect ratio of 4:3 or a signal having a wide aspect ratio; and an aspect ratio switching means for stopping the conversion operation of said aspect ratio converting means when said wide aspect discrimination signal detecting means detects inputting said standard system wide aspect television signal (D).

10. A wide picture plane/standard picture plane television signal receiving apparatus capable of selectively receiving a standard system television signal (A) and a standard system wide aspect television signal (D) having a picture plane of wide aspect ratio being squeezed and multiplexed with a wide aspect discriminating signal by inserting said wide aspect discriminating signal into the vertical blanking period of said standard system wide aspect television signal (D), said apparatus comprising:

a television signal input terminal for inputting said standard system television signal (A) and said standard system wide aspect television signal (D);

a wide aspect discrimination signal detecting means for discriminating said wide aspect discriminating signal multiplexed with said television signal inputted from said television signal input terminal to detect whether the input signal is said standard system television signal (A) or said standard system wide aspect television signal (D);

an aspect ratio conversion means of which aspect ratio conversion is controlled in accordance with an output of said wide aspect discrimination signal detecting means; and a wide display having displaying surface of wide picture plane aspect ratio.

11. A wide picture plane/standard picture plane television signal receiving apparatus according to claim 10, wherein said television signal input terminal is luminance/chrominance separation type input terminal.

12. A wide picture plane/standard picture plane television signal receiving apparatus according to claim 10, wherein said wide aspect discriminating signal is a signal multiplexed during the vertical retracing period of said converted standard system plane television signal (C).

* * * * *